UNITED STATES PATENT OFFICE.

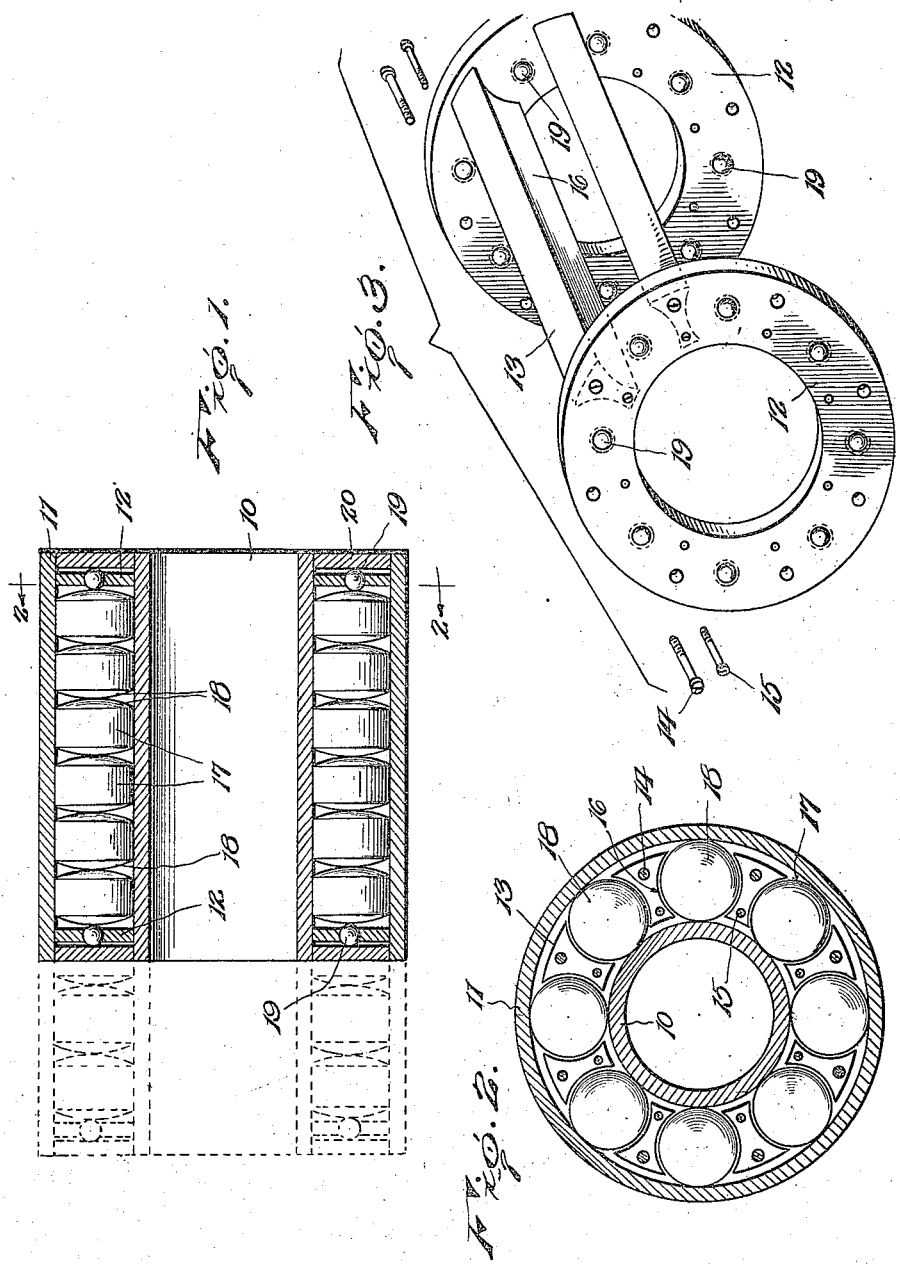

ALLEN B. BURKHOLDER, OF FLINT, MICHIGAN.

ROLLER BEARING.

1,426,038.  Specification of Letters Patent.  Patented Aug. 15, 1922.

Application filed August 7, 1920. Serial No. 401,985.

*To all whom it may concern:*

Be it known that I, ALLEN B. BURKHOLDER, citizen of the United States, residing at Flint, in the county of Genesee and State of Michigan, have invented certain new and useful Improvements in Roller Bearings, of which the following is a specification.

This invention relates to an improved roller bearing and has as one of its principal objects to provide a device of this character particularly adapted for radial and thrust loads.

The invention has as a further object to provide a bearing employing spaced series of disc rollers and wherein the rollers will be mounted for independent rotation so that the rollers of each series may individually turn without affecting the movement of adjacent rollers, this freedom of individual movement of the rollers permitting the load to be shifted evenly from one end of the bearing to the other to the periphery of the bearing at its greatest annular tracking surface.

The invention has as a further object to provide a bearing wherein the rollers will, due to the freedom of the rollers for independent rotation, each in turn receive and support its portion of the load.

And the invention has as a still further object to provide a bearing wherein the series of rollers will each be sustained against end thrust communicated through the intermediate rollers of each series to the end rollers of the series, by suitable ball bearings, and wherein the retaining means employed for the ball bearings will also provide a cage for the rollers.

Other and incidental objects will appear hereinafter.

In the drawings:

Figure 1 is a longitudinal vertical section taken medially through my improved bearing, this view also showing in dotted lines, a bearing of increased length.

Figure 2 is a transverse section on the line 2—2 of Figure 1, looking in the direction of the arrows, and Figure 3 is a perspective view particularly showing the ball bearing retaining rings of the device.

In carrying the invention into effect, my improved bearing is formed with a sleeve or inner case 10 which is surrounded by a cylindrical shell or outer case 11. Fitting over the end portions of the inner case are ball retainers 12 which are in the nature of annular rings and are snugly received within the outer case. Extending between the ball retainers within the outer case is a series of spacers 13 lying in concentric relation to the inner case and having their width disposed radially with respect thereto. The spacers are, as particularly shown in Figure 2, tapered from their outer edges toward their inner edges and securing the spacers to the ball retainers are pairs of pins, the pins of each pair being indicated, for convenience, at 14 and 15 respectively. These pins extend through the ball retainers into the end portions of the spacers and, as will be observed, the pins 14, which are arranged outermost, are somewhat larger in diameter than the pins 15 which are arranged innermost. As will be appreciated, these pins will serve to rigidly couple the spacers with the ball retainers so that the spacers will serve to brace and support said retainers with respect to each other forming a cage. At their sides, the spacers are formed with concave faces 16 and mounted between each pair of spacers is a series of disc rollers 17 supporting the inner case with respect to the outer case. These rollers are, as particularly shown in Figure 2, of a circumference corresponding to the radius of the concave faces 16 of the spacers so as to be held against displacement by the spacers when either the inner case or outer case is removed while at their ends the rollers are formed with convex faces 18, the convex faces of adjacent rollers of each series abutting. Friction between the rollers of each series will accordingly be materially reduced while, by this construction, the rollers may more easily rotate independently. As will be appreciated, the major diameter of the bearing may be increased by simply multiplying the number of series of rollers employed while by multiplying the number of rollers in each series the bearing may, as suggested in dotted lines in Figure 1, be increased in length. Formed in each of the ball retainers 12 is an annular series of spaced openings and loosely seated in these openings is an annular series of ball bearings 19. The balls of said series are arranged to coact with the outermost convex faces of the rollers at the ends of the series of rollers and as will be observed, the balls are mounted to engage the terminal rollers of said series axially. Surrounding the ends of the case 10 and snugly fitting within the case 11 are end rings 20 coacting with the series of balls 19 upon the rings 12. The end rings are hardened and provide thrust plates for the balls, said rings serving to prevent outward displacement of the balls.

As will now be readily appreciated in view of the preceding description, the rollers 17 of each series will be permitted to rotate independently and the speed of rotation of any one roller of each series will not affect the speed of rotation of adjacent rollers of said series. Consequently, as the load shifts from one end of the bearing to the other, the load will, since the rollers of the respective series may turn independently, be distributed evenly to the outside edge of the bearing which represents the greatest diameter in the annular tracking surface. As is well known, the common objection to an ordinary roller bearing is that due to the fact that a solid or semi-flexible roller is employed, the different parts of the bearing wear very fast on account of the load being differently disposed on the annular tracking surface. As will be seen, this disadvantage is, in the present instance, effectually overcome. Further, each roller of the several series will, as the thrust of the load spreads toward the ends of the bearing, in turn receive and support its share of the thrust since no one of the rollers of the several series is, as previously indicated, governed by the slightly less or greater speed of adjacent rollers. Where the thrust is communicated through the rollers of the series to the ends of the bearing, such thrust will be sustained by the series of ball bearings 19 coacting with the thrust plates 20. I accordingly provide a roller bearing of highly effective design and a bearing which will be found especially applicable for radial and thrust loads.

Having thus described the invention, what is claimed as new is:

1. In a roller bearing, the combination of a cage including alined rings, spacers extending between and connecting said rings, series of abutting rollers retained by the spacers and having their axes parallel to the axes of the rings, the rollers being journaled by the spacers for free individual movement, and anti-friction bearings carried by and journaled upon said rings to coact with the terminal rollers of each series.

2. In a roller bearing, the combination of a sleeve, a shell surrounding the sleeve, spaced series of abutting rollers bearing between the sleeve and shell parallel to the axis thereof, and end rings between the sleeve and shell confining the rollers, the rollers being loosely mounted for free individual movement for distributing thrust in opposite directions to said rings.

3. In a roller bearing, the combination of a sleeve, a shell surrounding the sleeve, spaced series of abutting rollers bearing between the sleeve and shell parallel to the axes thereof, the rollers being loosely mounted for free individual movement, and anti-friction bearings coacting with the terminal rollers of each series.

4. In a roller bearing, the combination of a sleeve, a shell surrounding the sleeve, spaced series of abutting rollers bearing between the sleeve and shell parallel to the axes thereof, the rollers being loosely mounted for free individual movement, anti-friction bearings coacting with the terminal rollers of each series, and thrust plates fitting between the sleeve and shell to coact with said anti-friction bearings.

5. In a roller bearing, the combination of a sleeve, a shell surrounding the sleeve, spaced series of abutting rollers bearing between the sleeve and shell parallel to the axes thereof, the rollers being loosely mounted for free individual movement, rings fitting between the sleeve and shell, anti-friction bearings journaled upon said rings to project at opposite sides thereof and coacting with the terminal rollers of each series, and thrust plates coacting with said anti-friction bearings.

6. In a roller bearing, the combination of a sleeve, a ring surrounding said sleeve, spacers extending between and connecting the rings to form a cage, a series of abutting rollers confined between said spacers parallel to the axis of the sleeve, the rollers being loosely mounted for free individual movement, a shell surrounding the sleeve and sustained by said rollers, anti-friction devices journaled on said rings to project at opposite sides thereof coacting with the terminal rollers of said series, and thrust rings fitting between the sleeve and shell coacting with said anti-friction bearings.

In testimony whereof I affix my signature.

ALLEN B. BURKHOLDER. [L. S.]